(12) United States Patent
Shepodd et al.

(10) Patent No.: US 7,422,701 B2
(45) Date of Patent: Sep. 9, 2008

(54) OXIDATION RESISTANT ORGANIC HYDROGEN GETTERS

(75) Inventors: Timothy J. Shepodd, Livermore, CA (US); George M. Buffleben, Tracy, CA (US)

(73) Assignee: Sandia Corporation, Livermore, CA (US)

( * ) Notice: Subject to any disclaimer, the term of this patent is extended or adjusted under 35 U.S.C. 154(b) by 565 days.

(21) Appl. No.: 10/891,533

(22) Filed: Jul. 14, 2004

(65) Prior Publication Data

US 2005/0051757 A1 Mar. 10, 2005

Related U.S. Application Data

(63) Continuation-in-part of application No. 10/091,044, filed on Mar. 4, 2002, now abandoned.

(51) Int. Cl.
*H01J 7/18* (2006.01)
*H01J 35/20* (2006.01)
*H01K 1/56* (2006.01)

(52) U.S. Cl. ............ 252/181.6; 252/181.3; 252/182.31; 252/184

(58) Field of Classification Search ................ 252/181.6
See application file for complete search history.

(56) References Cited

U.S. PATENT DOCUMENTS

| | | | | |
|---|---|---|---|---|
| 3,573,257 A | * | 3/1971 | Nakashio et al. | 528/217 |
| 4,011,200 A | * | 3/1977 | Yonemitsu et al. | 528/86 |
| 4,110,425 A | * | 8/1978 | Buhl et al. | 423/658.2 |
| 4,218,364 A | * | 8/1980 | Cooper et al. | 524/131 |
| 5,624,598 A | * | 4/1997 | Shepodd et al. | 252/182.12 |
| 5,717,014 A | * | 2/1998 | Ohkawachi et al. | 524/118 |
| 6,018,048 A | * | 1/2000 | Morikawa et al. | 546/185 |
| 6,426,314 B1 | * | 7/2002 | Carroll et al. | 502/150 |

* cited by examiner

*Primary Examiner*—Joseph D Anthony
(74) *Attorney, Agent, or Firm*—Donald A. Nissen

(57) ABSTRACT

A composition for removing hydrogen from an atmosphere, comprising a mixture of a polyphenyl ether and a hydrogenation catalyst, preferably a precious metal catalyst, and most preferably Pt. This composition is stable in the presence of oxygen, will not polymerize or degrade upon exposure to temperatures in excess of 200° C., or prolonged exposure to temperatures in the range of 100-300° C. Moreover, these novel hydrogen getter materials can be used to efficiently removing hydrogen from mixtures of hydrogen/inert gas (e.g., He, Ar, $N_2$), hydrogen/ammonia atmospheres, such as may be encountered in heat exchangers, and hydrogen/carbon dioxide atmospheres. Water vapor and common atmospheric gases have no adverse effect on the ability of these getter materials to absorb hydrogen.

17 Claims, No Drawings

OXIDATION RESISTANT ORGANIC HYDROGEN GETTERS

CROSS-REFERENCE TO RELATED APPLICATIONS

This application is a Continuation-in-Part of prior application Ser. No. 10/091,044, filed Mar. 4, 2002 now abandoned.

STATEMENT OF GOVERNMENT INTEREST

This invention was made with Government support under contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND OF THE INVENTION

The present invention is directed to a hydrogen getter material comprising a mixture of a polyphenyl ether and a hydrogenation catalyst, preferably a metal selected from Group VIII of the Periodic Table of the Elements.

In many applications the presence of hydrogen and its isotopes, arising from various chemical and electrochemical corrosion reactions, can be detrimental. Hydrogen can evolve from corrosion by atmospheric gases, by stray electric currents, from electronic devices, which can include batteries, operating in normal or abnormal condition, and from leaky hydrogen piping. The accumulation of hydrogen can present a significant fire and/or explosion hazard particularly in sealed components where special precautions may need to be taken to prevent dangerously high internal pressures from developing. Hydrogen corrosion is a particular problem in downhole fiber optic systems. Hydrogen attack in fiber optic systems reduces the optical transmission efficiency of these devices.

It has long been known that hydrogen absorbing materials, known as getters, can be used to counteract hydrogen accumulation. Ayers et al. discuss the use of active metals such as zirconium or titanium, and alloys thereof in U.S. Pat. No. 4,512,721. These metals are capable of maintaining low hydrogen partial pressures but have the disadvantage of requiring high temperatures for initial activation and/or ongoing operation (generally>300° C.) because of the necessity to diffuse surface contaminants into the bulk metal thereby providing a fresh surface for continued hydrogen absorption.

Labaton, in U.S. Pat. No. 4,886,048, describes another means for removing hydrogen by reacting the hydrogen with oxygen to form water, in the presence of a noble metal catalyst such as palladium, and trapping the water on a water absorbing material such as a molecular sieve. However, hydrogen getters of this type are expensive, bulky, limited by the availability of oxygen, and capable of causing a detonation if improperly formulated.

Conventional hydrogen getters, such as those described in the above-referenced patents are expensive, can require special operating conditions such as high temperature regimes or ancillary reactants in order to maintain low hydrogen partial pressures, generally will not work well or at all in the presence of water, may require the presence of oxygen, be poisoned by oxygen, and may pose significant safety hazards, including fire and explosion if handled improperly, for example exposure to air.

In order to overcome the aforementioned problems with conventional hydrogen getters, Shepodd in U.S. Pat. Nos. 5,703,378, 5,837,158 and 5,624,598 discloses and describes organic getter systems that employ unsaturated organic compounds combined (i.e., organic compounds that contain carbon-carbon double or triple bonds) with noble metal catalysts as hydrogen getter materials. While these organic getter systems have been shown to work well for temperatures below about 200° C., because of the presence of double or triple bonds in these prior art hydrogen getters they begin to degrade appreciably at temperatures above 200° C. and slowly over time at temperatures above about 150° C. Moreover, the unsaturated organic compounds will polymerize at elevated temperatures, thereby impairing their performance as hydrogen getters. However, there is a need for a hydrogen getter material that is capable of gettering hydrogen in the temperature range of 150-300° C. This need is acutely felt in the oil well industry where downhole fiber optic systems are used. Hydrogen present in the downhole environment attacks the fiber optic reducing its transmission efficiency. This temperature range (150-300° C.) is well above the effective operating range of prior art unsaturated organic hydrogen getters but below that where metallic getters can be used.

SUMMARY OF THE INVENTION

Accordingly, the present invention is directed to a material for effectively removing hydrogen from an atmosphere at temperatures in the range of about 150-300° C. and particularly from industrial environments such as that encountered in a downhole oil well environment. The hydrogen getter materials disclosed herein provide for removal of hydrogen at pressures less than 1 atm. and in the presence of contaminants such as common atmospheric gases, water, water vapor, and oil mists.

The hydrogen getter material of the present invention comprises a mixture of a polyphenyl ether and hydrogenation catalyst, preferably a metal selected from Group VIII of the Periodic Table of the Elements, hereinafter a precious metal, and most preferably Pt. In formulating the getter material, an inert binder material can be used to control the physical state of the getter material. In contrast to prior art organic hydrogen getter materials, the present hydrogen getter material is stable in the presence of oxygen, will not polymerize upon exposure to temperatures in excess of 200° C., or prolonged exposure to temperatures in the range of 100-300° C.

The novel hydrogen getter material disclosed herein can be used to efficiently remove hydrogen at temperatures in excess of 200° C. at pressures of less than 1 atm. and from mixtures of hydrogen/inert gas (e.g., He, Ar, $N_2$), hydrogen/ammonia atmospheres, such as may be encountered in heat exchangers, and hydrogen/carbon dioxide atmospheres. Water vapor and common atmospheric gases, such as oxygen, have no adverse effect on the ability of these getter materials to absorb hydrogen. Liquid water does not have an adverse effect on the efficiency of these hydrogen getters except that, if submerged, the reaction with hydrogen can be limited by the rate at which hydrogen can diffuse through liquid water.

DETAILED DESCRIPTION OF THE INVENTION

The present invention provides a composition for absorbing hydrogen at a pressure of less than about 1 atm. from an atmosphere. This novel hydrogen absorbing composition is stable in the presence of oxygen, will not polymerize upon exposure to temperatures in excess of 200° C., or prolonged exposure to temperatures in the range of 100-300° C. Moreover, the composition is capable of absorbing hydrogen from atmospheres that comprise mixtures of hydrogen/inert gas (e.g., He, Ar, N2), hydrogen/ammonia atmospheres, such as may be encountered in heat exchangers, and hydrogen/carbon dioxide atmospheres.

The hydrogen absorbing composition comprises a mixture of a polyphenyl ether and a hydrogenation catalyst, preferably a precious metal catalyst, and most preferably Pt. Throughout the written description, the art-recognized term "hydrogen getter" will be used to denote the inventive hydrogen absorbing composition.

In contrast to prior art organic hydrogen getter materials, wherein hydrogen reacts with carbon-carbon double or triple bonds in the presence of a catalyst (Shepodd, op. cit.) to produce an alkane, the present invention employs a phenyl moiety in the form of a polyphenyl ether and hydrogen is added to the phenyl rings.

As represented in below, polyphenyl ethers are aromatic ethers that consist, generally, of basic structural units comprising alternating phenyl groups and oxygen atoms.

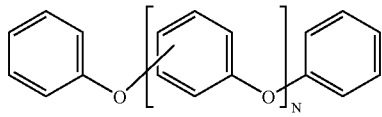

The value of n, number of basic structural units, can be varied to provide desired properties. Hydrogenation of a polyphenyl ether in the presence of a hydrogenation catalyst is a heterogeneous reaction. As will be readily appreciated, in order to achieve the highest degree of effectiveness in removing hydrogen it is desirable that the polyphenyl ethers used to prepare the hydrogen getter material be mobile enough to provide for intimate contact with the catalyst. Thus it is preferred that the value of n be greater than 3 in unsubstituted polyphenyl ethers and most preferably in the range of 4-7. However, effective hydrogen getter materials can be prepared from polyphenyl ethers having a value of n less than 3 (i. e., diphenyl ethers that are solid at room temperature) by mixing a catalyst material with the liquid produced by melting the ether and comminuting the solid mixture.

Polyphenyl ethers are thermally stable and resistant to oxidation up to temperatures of 300° C. Moreover, at temperatures below 200° C. polyphenyl ethers have very low vapor pressures (*Synthetic Lubricants and High-Performance Functional Fluids*, $2^{nd}$ edition, Rudnick, L. and Shubkin, R., Marcel Dekker, Inc. 1999). Unlike prior art getter materials, polyphenyl ethers will not polymerize at elevated temperatures (i.e., T greater than about 100° C.) when combined with a precious metal catalyst.

The getter materials can be formulated by mixing or blending together a polyphenyl ether and a precious metal hydrogenation catalyst to form a powder or paste, depending upon the ratio of components. Useful hydrogenation catalysts include Pd, Pt, Au, Rh, and Ru or combinations or alloys thereof. A preferred hydrogenation catalyst is Pt. The hydrogenation catalyst can either be added as a metal powder; as a supported catalyst, wherein the catalyst is dispersed on an inert material, or support, such as activated carbon, aluminum oxide, or barium carbonate; or as a metallic salt that is reduced to the metal upon contact with hydrogen. Typically, about 5-50 wt % of a supported catalyst containing about 1-10 wt % metal, or an equivalent weight of metal powder, is combined with the ether.

Binders or fillers that are inert with respect to reaction with hydrogen can be included in the hydrogen getter formulation to tailor the properties of the getter material and can take many forms. The simple addition of inert polymers, thixotropic agents, minerals, carbon powders, or finely divided silica can be used to mediate the reaction rate, act as a heat sink, and modify the physical properties of the getter. If a binder is used, it is preferred that the inert binder material be present in a concentration of from about 20-70 wt %. It should be noted that the hydrogenation catalyst can also act as a binder, however, additional catalyst will speed the reaction but reduce the hydrogen-absorbing capacity per unit mass of formulated getter and increase the cost.

As discussed above, these getter materials are capable of removing hydrogen from gas mixtures. Of particular interest is the removal of hydrogen from hydrogen/oxygen mixtures. It will be appreciated that hydrogen and oxygen can form explosive mixtures over the concentration range of about 6 to about 70 vol % $H_2$. Noble metal hydrogenation catalysts, especially when heated can initiate ignition of a hydrogen/oxygen gas mixture within the explosive concentration range. However, it is believed that two reactions occur simultaneously in the getter material during the course of hydrogen absorption in a $H_2/O_2$ atmosphere. One is the combination of hydrogen and oxygen in the presence of the hydrogenation catalyst to make water. The second is the hydrogenation of the phenyl rings of the polyphenyl ether. The generation of heat with the consequent heating of surrounding material occurs both as hydrogen and oxygen combine exothermically and rapidly in the presence of a catalyst to make water as well as a consequence of the hydrogenation of the unsaturated carbon-carbon bonds in the organic polymer molecule. If means to control the reaction rate are not provided, such as that described in the present invention, detonation of the hydrogen/oxygen gas mixture can take place. The inventors have discovered that in addition to their ability to absorb hydrogen, the polymer getter materials of the present invention have an additional advantage in that they can moderate the explosively rapid reaction that can take place between hydrogen and oxygen, in the presence of a catalyst, making a detonation unlikely. It is believed that safe removal of hydrogen from $H_2/O_2$ mixtures is possible because hydrogenation of the phenyl rings provides a competitive reaction to the potentially explosive $H_2/O_2$ combination reaction. Further, the getter material provides a heat sink to prevent localized overheating, and a diluting medium to restrict access of hydrogen and oxygen to the catalyst thereby slowing the $H_2/O_2$ reaction. Moreover, the getter material can switch back and forth between acting as a catalyst for hydrogen/oxygen recombination and hydrogen absorber without any loss in efficacy.

The present invention now will be described more fully by way of various examples illustrative of the invention. This invention may, however, be embodied in many different modifications that will be obvious to those of skill in the art without departing from the invention as set forth in the claims.

Table 1 identifies various formulations that were prepared to illustrate the invention. The formulations shown in Table 1 were all prepared by mixing the components together to provide a dispersion of the catalyst throughout the getter material. Because of the heterogeneous nature of the hydrogenation reaction and the limited mobility of the polyphenyl ethers, it is important that the catalyst be uniformly dispersed throughout the getter material in order to provide maximum efficiency. In this regard, while hand mixing will yield useable working formulations mechanical mixing is preferred to fully and uniformly disperse the catalyst. Different mechanical mixers such as blenders, attritors, or kneaders are effective depending upon the viscosity of the starting materials and product. Liquids such as organic solvents or water can be added as processing aids, however, were not used to prepare the formulations shown in Table 1.

TABLE 1

| Formula | Composition | Physical State |
|---|---|---|
| A | 53 g. 1% Pt/C, 73 g Santovac ® 5* | Paste |
| B | 45 g carbon black, 22.5 g 1% Pt/C 23.1 g Santovac ® 5 | Powder |
| C | 20 g carbon black, 10 g Pt/C 20 g Santovac ® 5 | Powder |
| D | 20 g carbon black, 10 g 10% Pt/C 20 g Santovac ® 5 | Powder |
| E | 20 g carbon black, 10 g 1% Pt/C 20 g OS-138# | Powder |

*Santovac ® 5 is m-Bis(m-phenoxyphenoxy)benzene and can be obtained from Santovac Fluids, Inc., St. Charles, Missouri.
OS-138 is Bis[m-(m-phenoxyphenoxy)phenyl]ether and can be obtained from Santovac Fluids, Inc., St. Charles, Missouri.

Each of the formulations shown in Table 1 was placed in a reactor, the reactor was heated to a predetermined temperature and about 10 Torr of hydrogen was admitted to the reactor. Calculated reaction rates, based on pressure measurements, are shown in Table 2.

TABLE 2

($PH_2 \approx 10$ T)

| Formula | T (C.) | Reaction Rate (std cc/g-s) |
|---|---|---|
| A | 100 | 3.0e-3 |
|   | 200 | 7.8e-3 |
|   | 250 | 1.1e-3 |
|   | 300 | 3.8e-2 |
| B | 21 | 3.5e-5 |
|   | 41 | 9.3e-5 |
|   | 62 | 1.5e-4 |
|   | 83 | 2.8e-4 |
|   | 100 | 2.4e-4 |
| C | 23 | 9.0e-6 |
|   | 55 | 7.6e-5 |
|   | 82 | 2.0e-4 |
|   | 108 | 3.2e-4 |
| D | 23 | 1.3e-3 |
|   | 54 | 1.0e-3 |
|   | 80 | 1.5e-3 |
|   | 105 | 3.2e-3 |
| E | 24 | 6.5e-6 |
|   | 54 | 6.0e-5 |
|   | 79 | 1.7e-4 |
|   | 104 | 2.7e-4 |

While the hydrogen getter composition is intended to function at temperatures where other hydrogen getter materials fail (i.e., T>200° C.), careful examination of the data in Table 2 shows that the polyphenyl/Pt getter material can be made to work effectively at temperatures much less than that by excess loading of the hydrogen catalyst material. It has been found that for metal catalyst concentrations greater than about 0.5 wt % the hydrogen gettering efficiency at temperatures below 200° C. is markedly increased. This effect is shown in Table 3 where the ratio of the rate of hydrogen absorption for a ten-fold increase in Pt catalyst loading is given for various temperatures ranging from about 25° C. to about 100° C.

TABLE 3

| Ratio of $H_2$ absorption rates | T (° C.) |
|---|---|
| 143 | 23.4 |
| 13.3 | 54.4 |
| 7.2 | 81.2 |
| 9.7 | 106.8 |

As the temperature increases the increase in the ratio of hydrogen absorption rates begins to asymptotically approach the Pt catalyst-loading ratio of 10.

The ability of the hydrogen getter composition to absorb hydrogen over the pressure range between 10 and 760 Torr is shown in Table 4. As before, the hydrogen getter compositions were sealed in a reactor, the reactor was heated to 200° C. and hydrogen was admitted to a predetermined pressure. For the experiments, whose results are shown in Table 4, getter composition B (cf. Table 1) was employed.

TABLE 4

(T = 200° C.)

| Pressure (Torr) | Reaction Rate (std cc/g-s) |
|---|---|
| 15 | 1.1e-4 |
| 130 | 2.2e-4 |
| 260 | 2.2e-3 |
| 400 | 2.7e-3 |
| 480 | 4.23-3 |
| 700 | 1.2e-2 |

We claim:
1. A composition for absorbing hydrogen comprising:
a mixture of a polyphenol ether having the general structure

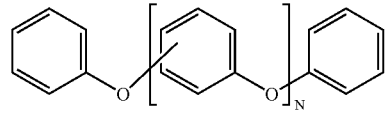

wherein n is from 3-7 and
a precious metal hydrogenation catalyst.
2. The composition of claim 1, wherein the hydrogenation catalyst is Pt.
3. The composition of claim 1, wherein the hydrogenation catalyst is present at a concentration of from about 0.5 to 5 wt %.
4. The composition of claim 1, wherein the hydrogenation catalyst is supported on a porous solid.
5. The composition of claim 4, wherein the porous solid is activated carbon, aluminum oxide, or barium carbonate, or combinations thereof.
6. The composition of claim 1, further including a binder or filler.
7. The composition of claim 6, wherein the binder or filler is an inert polymer, a thixotropic agent, a mineral, a carbon powder, or finely divided silica.
8. The composition of claim 7, wherein the binder or filler is present at a concentration of from about 20-70 wt %.
9. A composition for absorbing hydrogen from a gas mixture, comprising:
a mixture of a polyphenyl ether and a precious metal hydrogenation catalyst, wherein the polyphenyl ether has the general structure

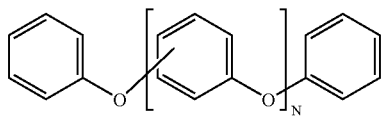

wherein n is from 3-7.

10. The composition of claim 9, wherein the gas mixture contains oxygen or water vapor or a mixture thereof.

11. The composition of claim 9, wherein the hydrogenation catalyst is Pt.

12. The composition of claim 11, wherein the hydrogenation catalyst is present at a concentration or from about 0.5 to 5 wt %.

13. The composition of claim 9, wherein the hydrogenation catalyst is supported on a porous solid.

14. The composition of claim 13, wherein the porous solid is activated carbon, aluminum oxide, or barium carbonate, or combinations thereof.

15. The composition of claim 9, further including a binder or filler.

16. The composition of claim 15, wherein the binder or filler is an inert polymer, a thixotropic agent, a mineral, a carbon powder, or finely divided silica.

17. The composition or claim 15, wherein the binder or filler is present at a concentration of from about 20-70 wt %.

* * * * *